United States Patent [19]
Hamisch et al.

[11] Patent Number: 5,247,252
[45] Date of Patent: Sep. 21, 1993

[54] SENSOR FOR DETERMINING ANGULAR VELOCITY WITH PIEZOCERAMIC COMPONENT FORMED AS THICKNESS SHEAR OSCILLATOR

[75] Inventors: Hansjoachim Hamisch; Hans-Jürgen Kaiser; Manfred Boruschewitz, all of Berlin, Fed. Rep. of Germany

[73] Assignee: Robert Bosch GmbH, Stuttgart, Fed. Rep. of Germany

[21] Appl. No.: 646,605
[22] PCT Filed: Sep. 16, 1989
[86] PCT No.: PCT/DE89/00592
   § 371 Date: Jan. 29, 1991
   § 102(e) Date: Jan. 29, 1991
[87] PCT Pub. No.: WO90/07124
   PCT Pub. Date: Jun. 28, 1990

[30] Foreign Application Priority Data
Dec. 22, 1988 [DE] Fed. Rep. of Germany ....... 3843143

[51] Int. Cl.$^5$ .............................................. G01C 19/56
[52] U.S. Cl. ........................................ 324/160; 73/505
[58] Field of Search ........................... 324/160; 73/505

[56] References Cited
U.S. PATENT DOCUMENTS
3,842,681 10/1974 Mumme ................................. 73/505

Primary Examiner—Walter E. Snow
Attorney, Agent, or Firm—Michael J. Striker

[57] ABSTRACT

A sensor (10) for determining angular velocity includes one or a plurality of piezoceramic plates (11, 12, 31 to 34), which are suitably oriented with respect to the axis of rotation and execute shear oscillations with the aid of an exciting circuit. If the sensor (10) is located in a rotating system, piezoelectric charges are generated on specific plate surfaces by generated Coriolis forces ($K_c$). These charges represent a measure of the rotational velocity ($\Omega$).

7 Claims, 5 Drawing Sheets

SENSOR FOR DETERMINING ANGULAR VELOCITY WITH PIEZOCERAMIC COMPONENT FORMED AS THICKNESS SHEAR OSCILLATOR

BACKGROUND OF THE INVENTION

The invention relates to a sensor for determining angular velocity and including at least one piezoceramic component such as oscillation gyrometer. Known oscillation gyrometers generally use low-frequency flexural oscillators, e.g. bar oscillators, cylindrical oscillators or tuning-fork oscillators. In gyrometers with bar oscillators and cylindrical oscillators, comparitively small piezoceramic components are mounted on larger, non-piezoelectric oscillating bodies. The bodies effect the excitation of oscillations, serve as sensor for the amplitude control, and convert the action of the Coriolis force on the oscillating body into the measuring signal. Since a component or a component pair is required for each individual function, the construction of this gyrometer is complicated. Furthermore, the different expansion coefficients of the oscillating body and of the piezoceramic components lead to thermally determined mechanical stresses, which can result in comparitively large temperature dependencies of the measuring signal.

In gyrometers with tuning-fork oscillators, use is made of a piezoelectric oscillating body on which no additional exciting components must be mounted. However, the coupled flexural oscillators are likewise excited to resonance by action of the Coriolis force, so that strong temperature dependencies exist for the measuring signal even with this gyrometer.

For all the gyrometers mentioned, the oscillation frequencies employed are relatively low, and are located in the region of the frequencies of vibrations or only slightly removed therefrom, so that the measuring signals obtained are relatively strongly influenced by these interference signals.

SUMMARY OF THE INVENTION

The object of the invention is a sensor for determining angular velocity which does not require additional oscillators and has a very simple, but mechanically stable construction.

The object of the invention is achieved by forming the piezoceramic component as a thickness shear oscillator. The absence of additional components on the oscillating body improves the performance in the case of temperature changes. Furthermore, the sensor has a relatively low sensitivity to vibrations. This is achieved by large frequency spacing, which is obtained by forming the component as a thickness shear oscillator, between the signal frequency and the interference frequencies of vibrations. Such spacing enables an effective filtering with a high-pass filter in the signal path. This is supported by a considerable compensation of the interference charges, induced by vibration, in the case of parallel connection of two sensors with opposite orientation of their polar Z-axes, as shown in FIG. 5. At the same time, because of the addition of the useful signals, a higher measuring sensitivity is achieved.

The present invention both as to its construction so to its mode of operation, together with additional objects and advantages thereof, will be best understood from the following detailed description of the preferred embodiments when read in connection with the accompanying drawings.

DETAILED DESCRIPTION OF THE PREFERRED EMBODIMENTS

Figure 1:
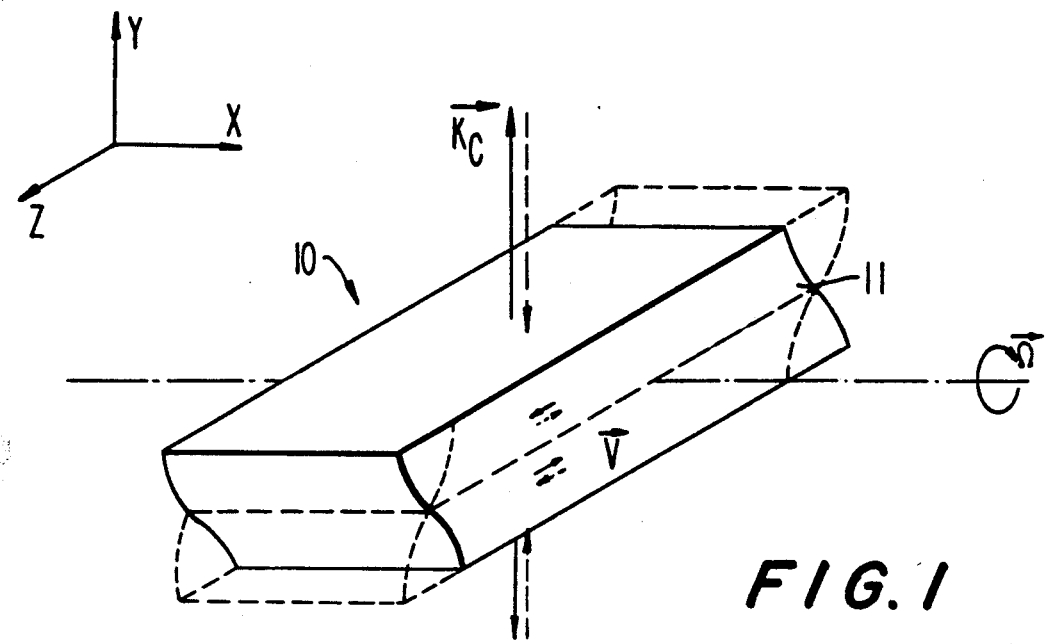
FIG. 1 is a diagrammatic view representing a measurement principle according to the invention with reference to a three-directional coordinate system.
Figure 2:
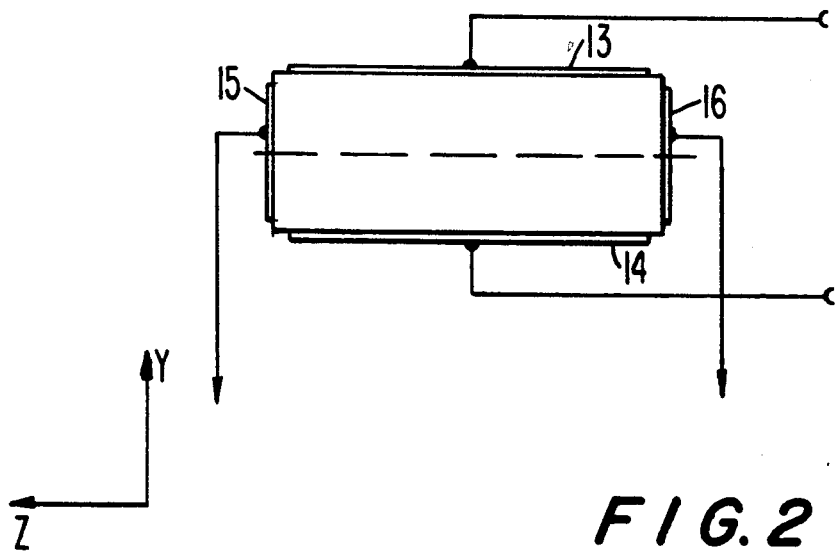
FIG. 2 is a diagrammatic view representing the measurement principle according to the invention with reference to a two-dimensional coordinate system.

The measurement principle of the sensor 10, which consists in its simplest form of a piezoceramic plate 11, is represented diagrammatically in FIGS. 1 and 2. In accordance with the co-ordinate system illustrated in FIG. 1, the sensor 10 is markedly larger in the z-direction, which, by definition, represents the direction of the polar axis, than in the two other (x-, y-) directions. The excitation of oscillations is effected via the electrodes 13, 14 on the y-surfaces, which are illustrated in FIG. 2 and via which the sensor 10 becomes a frequency-determining component of an oscillator circuit. The position of a plane is expressed in a known fashion by the direction of its normal period. The possibility of exciting the sensor 10 arises from the piezoelectric characteristics of the ceramic plate 11, in which periodic shears $y_z$ of the plate 11 are produced in accordance with the equation $y_z = d_{15} \cdot E_y$ by an alternating electric field $E_y$. The proportionality factors $d_{15}$ and $d_{31}$, ... in the relationships between electric and mechanical variables are designated as piezoelectric coefficients.

The measurement of the angular velocity $\vec{\Omega}$ is based on the Coriolis force $\vec{K}_c$, is experienced by a mass m moved with the velocity $\vec{v}$ in the rotating system $\vec{K}_c = 2 m\vec{v} \times \vec{\Omega}$. The modulus of the Coriolis force $\vec{K}_c$ is proportional to the modulus of the angular velocity $\vec{\Omega}$, while its direction as determined by the vector product $\vec{v} \times \vec{\Omega}$ changes in sign with the sense of rotation of the angular velocity $\vec{\Omega}$. The distance of the axis of rotation plays no role in this regard. For the mass elements m of the sensor 10, the velocity is given by the oscillatory motion produced by the alternating electric field $E_y$, so that the velocity vector $\vec{v}$, as illustrated in FIG. 1, extends parallel to the z-axis. In the nodal plane of the plate 11, the magnitude of the velocity vector $\vec{v}$ is equal to zero, and its direction changes the sign there. The phase of the Coriolis forces $\vec{K}_c$, which are periodic with respect to the velocity vector $\vec{v}$, is shifted with respect to the phase of the amplitude of oscillation by $\pi/2$.

The amplitude of the velocity, which is determined by the product of the amplitude of oscillation and the oscillation frequency, can assume satisfactory values even in the case of shear oscillations with very small amplitudes of the order of magnitude of micrometers, since the frequency can be rendered correspondingly high. With the use of a high oscillation frequency, e.g.

160 kHz, the oscillation frequency also being the signal frequency at the same time, the frequency spacing becomes much larger with respect to interference signals, which arise from vibrations, than in the case of known processes. As a consequence of the reduction, which is thereby possible, in the interference signals with a high-pass filter, there is a lower sensitivity to vibration.

The orientation of the z-axis to the angular velocity vector $\vec{\Omega}$ which is to be measured, is to be chosen in this regard such that the periodic mechanical stresses on the z-surfaces causes by the Coriolis forces $\vec{K}_c$, generate periodic charges as a consequence of the piezoelectric characteristics. These charges then represent a measure of the angular velocity.

For this purpose, the angular velocity vector $\vec{\Omega}$ must be oriented parallel to the x-axis. The Coriolis forces $\vec{K}_c$ then act parallel to the y-axis and produce normal stress components $Y_y$, which then generate the charges, which are proportional to the angular velocity $\Omega$, on the z-electrodes in accordance with $D_z = d_{31} \cdot Y_y$ ($D_z$ is the dielectric displacement, having the dimension of a surface charge density). If the vector has a different position with respect to the sensor 10, only its x-components become effective, because the y-components of the angular velocity $\vec{\Omega}$ generates only shear tensions $X_y$, which do not generate charges. Furthermore, the components of the angular velocity vector $\vec{\Omega}$ produce no Coriolis forces at all, since the angular velocity vector $\vec{\Omega}_z$ is oriented parallel to the motion $\vec{v}$ of the oscillating masses. If, e.g. in the case of a motor vehicle driving in a curve, the angular velocity is measured about the vertical axis of the vehicle, the x-axis of the sensor 10 extends parallel to this axis.

The use of piezoceramic material is necessary in order to obtain satisfactorily high values of $d_{31}$. It is certainly true that the sensitivity can be increased by increasing the plate volume. However, narrow limits are placed on this by the application conditions.

The output signal proportional to the angular velocity $\vec{\Omega}$ is obtained by phase-sensitive rectification from the filtered and amplified signal at the signal electrodes 15, 16 of the sensor 10. Since the phase angle of the periodic recharging of the z-electrodes varies by 180° with reversal of the direction of rotation, the sign of the direct voltage specifies the sense of rotation.

Figure 3:
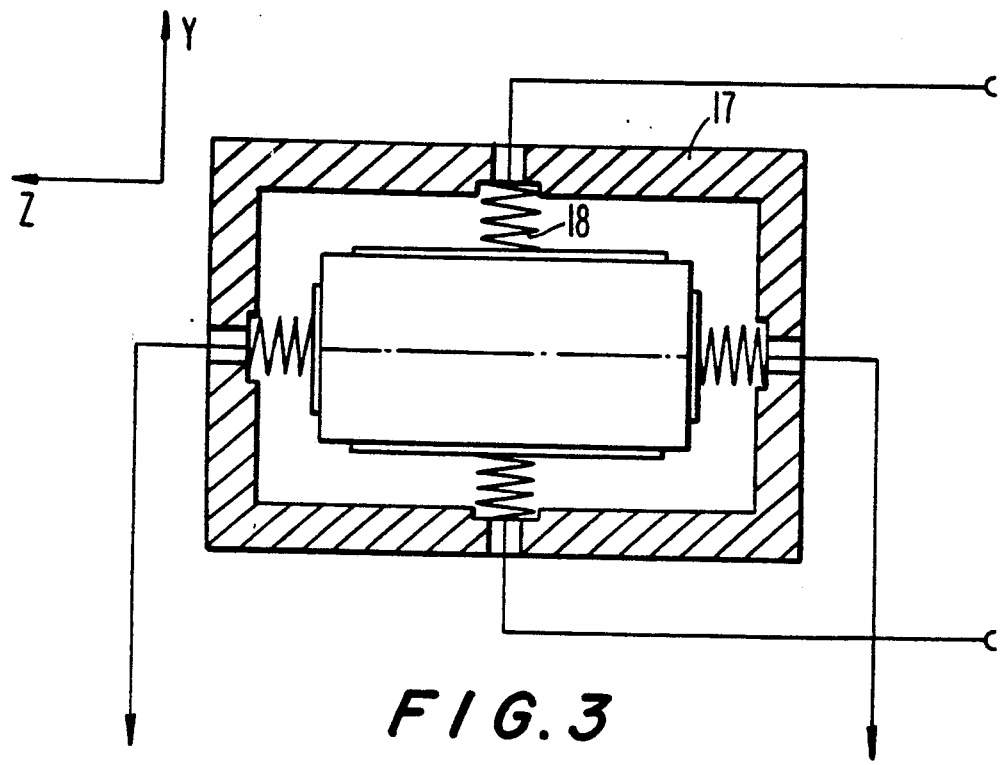
FIG. 3 is a cross-sectional view of a first embodiment of a sensor according to the invention.

An illustrative embodiment of the design of the sensor 10 is represented in FIG. 3. Here, the sensor 10 is suspended in a frame 17 with the aid of contact springs 18. The contact springs 18 serve both for the elastic suspension of the sensor 10 in the frame 17, and the transmission of the electric measuring signal or of the electric exciting signal to the corresponding electrodes of the sensor 10. If the angular velocity of a rotation is to be measured about a vertical axis, the frame 17 of the sensor 10 is to be installed horizontally in the rotated total system. Suitable as contact springs 18 is any resilient body which does not essentially hamper the shear oscillations of the sensor 10, and which simultaneously assumes the electrical contacting through its own conductivity, or metallization, or in combination with thin wires. With this soft mounting, a certain vibration isolation is achieved, which can, perhaps, require a resilient support on the x-surface, which can further be supported by an oscillation isolation of the frame. However, the softer the suspension of the sensor 10, the lower the temporal resolution of the measurement of angular velocity becomes.

Figure 4:
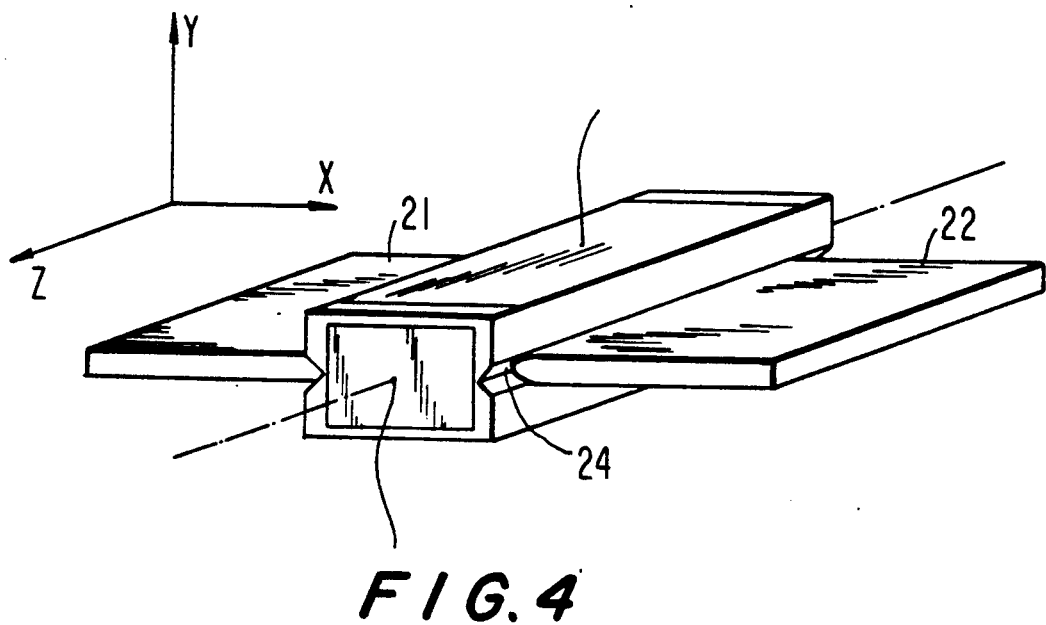
FIG. 4 is a perspective view of a second embodiment of a sensor according to the invention.

A higher temporal resolution of the measuring signal is achieved with the illustrative embodiment represented in FIG. 4, in which the sensor 10 is held two pressure plates 21, 22. For this purpose, two longitudinal grooves 34, into which the knife-edges of the pressure plates 21, 22 are inserted, are constructed in the nodal line of the sensor 10, extending in the z-direction in the x-surfaces. However, it is also conceivable for the pressure plates 21, 22 to be applied to the x-surfaces of the sensor 10 without longitudinal grooves having been provided.

Figure 5:
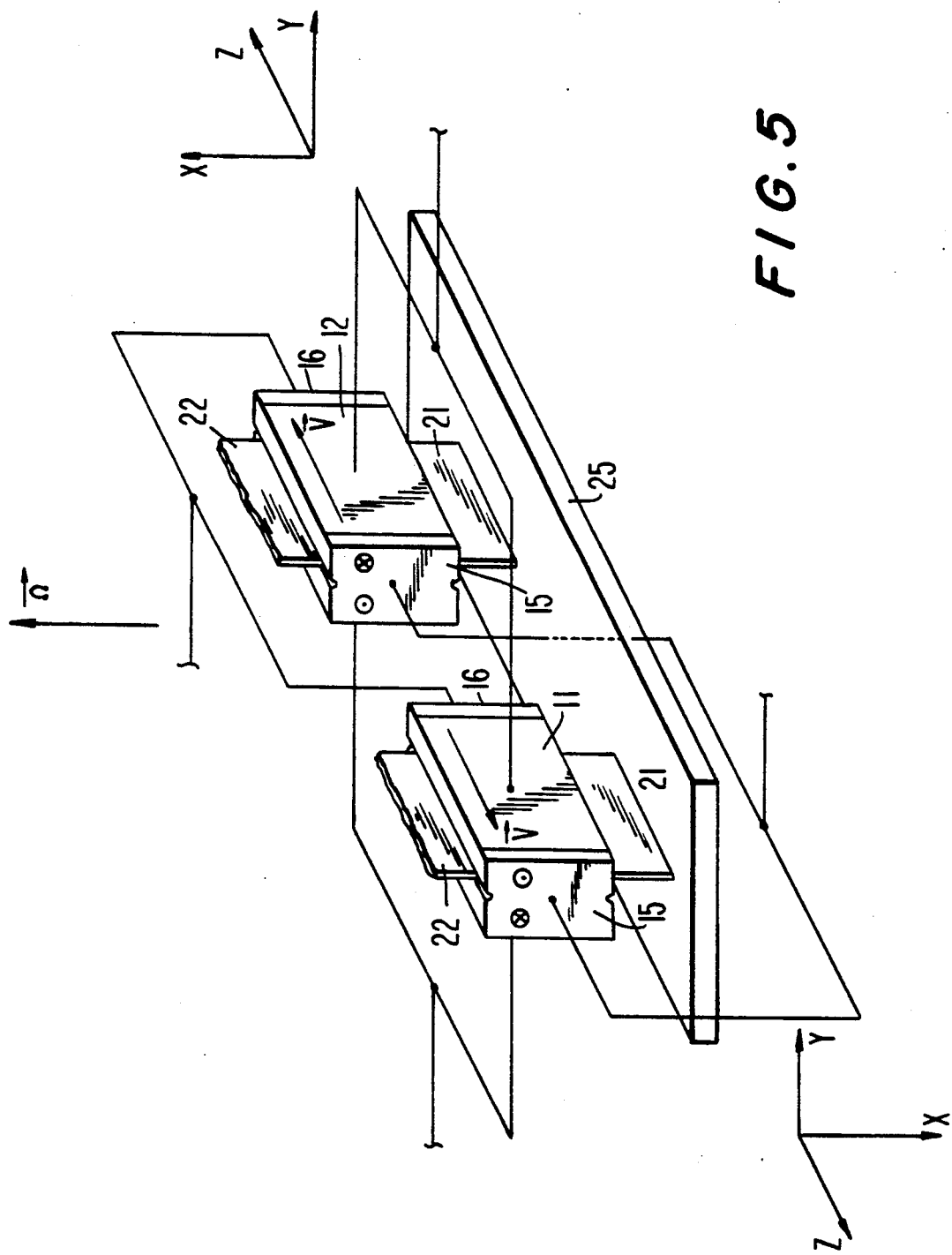
FIG. 5 is a perspective view of a third embodiment of a sensor according to the invention.

If, in the case of the relatively hard mounting with the aid of the frame 17 according to FIG. 4, the suppression of the influence of interference voltages, induced by vibration, by the above-mentioned filtering of the low-frequency signal components by high-pass filter is not satisfactory, the occurrence of interference charges can be considerably reduced as early as on the signal electrodes 15, 16 by compensation by the combination of two sensors 10, i.e. of two sensor plates 11, 12, as represented in FIG. 5. Low-frequency oscillations at the mounting side of the sensor 10 can, be caused e.g. by the unevenness of the road or by the engine vibrations. When the vibratory motions are transferred to the sensor plate 11, an inertial force is produced therein, which leads to mechanical stresses. The shear stresses thereby produced generate no charges on the signal electrodes of the z-surfaces, but charges are generated by all normal voltage components $X_x$, $Y_y$, $Z_z$. In the case of the individual plate, the magnitude of the charges thereby generated can be very much larger than the measuring signal at the required detection limit. However, if, as a consequence of the vibrations occurring, virtually the same mechanical shear stresses act through the mounting 25 on the two sensor plates 11, 12 with parallel z-axes, as represented in FIG. 5, the interference charges, generated by said vibrations, on the signal electrodes 15, 16 of the two plates 11, 12 are equally large. Upon interconnection of two electrodes in each case, on which the interference charges are of opposite sign, the desired compensation of interference charges then takes place. At the same time, the signals are also added together if the oscillations of the two plates 11, 12 are excited in antiphase, as shown in the illustrated embodiment according to FIG. 5. In this process, compressive stresses arise in one sensor plate 11, while tensile stresses are produced in the other, or vice versa. This holds in all orientations for all types of force, which arise as a consequence of linear vibrations and rotary oscillations, i.e. for accelerating, centrifugal and Coriolis forces.

Figure 6:
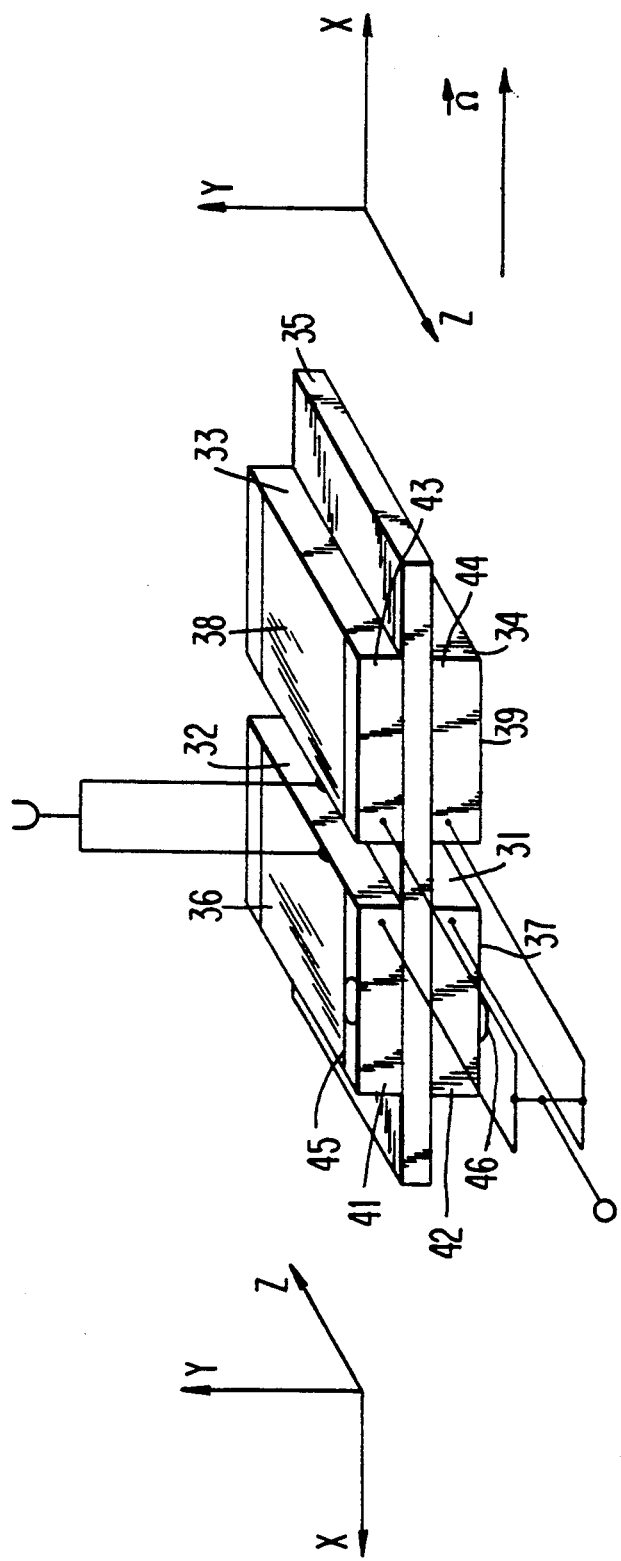
FIG. 6 is a perspective view of a fourth embodiment of a sensor according to the invention.
Figure 7:
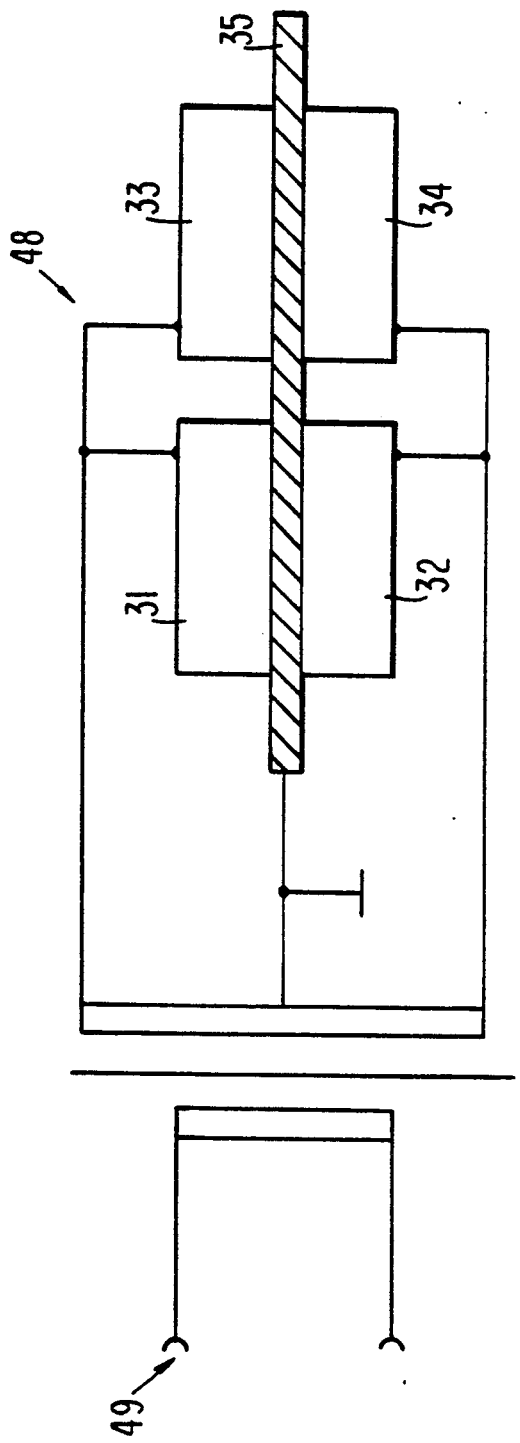
FIG. 7 is a schematic view showing electrical connection of the sensor with exciting voltage.

An increase in the output signal and compensation for interference effects is also possible with the an arrangement according to FIG. 6, which largely corresponds to that according to FIG. 5. Here, four piezoelectric plates 31 to 34, which are firmly connected to a substrate 35, are used instead of the $\lambda/2$ oscillator. The plates 31 and 34 therefore represent a $\lambda/4$ oscillator. The result of this is a very compact and stable arrangement. The plates 31 and 34 can, e.g. be soldered onto a metal plate, or be affixed to a ceramic substrate with a conductive adhesive. The metal plate or the conductive adhesive then serves the purpose of excitation as one of the electrodes 13 or 14. The z-axis of the plates 31 to 34, i.e. their polar axes, lie in the plane of the substrate 35. In the pairs of plates 31, 32 or 33, 34, their direction is the same in each case, which is represented in FIG. 6 by the assigned co-ordinate systems. The shear motion of the plates 31 to 34 is respectively diagonally co-phasal. This distribution of oscillation avoids movement of the center of gravity of the system of plates 31 and 34 and the substrate 35, and thereby avoids coupling of transverse motions into the substrate 35. Moreover, the torques connected with the shear motions are largely compensated in the substrate 35. In order, given the predetermined location of the z-axis, for the excitation of the thickness shear oscillations to be possible in the desired antiphasal situation, the y-electrodes 36 to 39 of the sensors plates 31 to 34 are connected with a transformer 39 to the voltage source, as represented in FIG. 7. The charges generated on the z-electrodes of one side, e.g. 41 to 44 in FIG. 6, by the rotation of the sensor about the x-axis have the same sign, so that the four z-electrodes of each side can be interconnected, as is also represented for the z-electrodes 41 to 44. As in the case of the sensor 10 according to FIG. 5, here too, the low-frequency interferences are then largely compensated, while the useful signals are added together.

In the case of all the above-mentioned versions of the sensor (FIGS. 3 to 4), interference voltages, which must be compensated as effectively as possible, although they are not in phase with the signal, occur at the signal output even without rotation of the sensor. They are partly determined by unavoidable capacitancies between the excitation electrodes and the leads and the signal electrodes. Interference signals, which are due to piezoelectric secondary effects of the stray fields between the excitation and signal electrodes, are superposed. A component voltage of suitable magnitude and phase angle, which is superposed at the signal output of the sensor plates, is formed from the excitation voltage for the purpose of compensation. Furthermore, a harmonic signal occurs in the case of sensors with freely oscillating plates (FIGS. 3 to 5), that is to say in the case of λ/2 oscillators. Said signal arises from the y-components of the plate oscillations, which are formed perpendicular to the z-plane at the ends of the plate as a consequence of the freedom from stress at the surfaces. So that the switching of the phase-sensitive rectification is not overridden by the harmonic signal, the latter should be sufficiently suppressed in the signal path by a low-pass filter.

Since, as stated above, the magnitude of the measuring signal depends on the amplitude of oscillation of the sensors 10, said amplitude must be held constant. This can be done most reliably over a lengthy period by measuring the amplitude of oscillation. In the case of sensors with freely oscillating plates, the above-mentioned harmonic signal clearly depends upon the amplitude of oscillation, and is consequently suitable for control. In this process, the exciting voltage is controlled in such a way that a predetermined value of the harmonic signal is held constant. For this purpose, a harmonic signal should be tapped in the signal path before filtering. The use of the harmonic signal has the advantage that the measurement of the amplitude of oscillation requires no additional sensors or electrodes, and that a corruption of the control signal by leakage of the much larger exciting voltage is virtually excluded because of the possibility of filtering. In the case of a sensor according to FIG. 6, in addition to the exciting electrodes 36, 37 additional small electrodes 45, 46 are to be applied on the y-surfaces for this measurement of the amplitude of oscillation.

While the invention has been illustrated and described as embodied in a sensor for measuring angular velocity, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A sensor for determining an angular velocity comprising at least one piezoceramic element having a polar axis and formed as a thickness shear oscillator having flat surfaces and side surfaces arranged so that said polar axis is parallel to said flat surfaces and perpendicular to said side surfaces, said sensor having exciting electrodes located on said flat surfaces and measuring electrodes located on said side surfaces for measuring angular velocity proportional to charge of said piezoceramic element, so that shear oscillation in direction of said polar axis is produced and during rotation about a rotary axis extending perpendicular to said polar axis and parallel to said flat surfaces Coriolis forces are produced which cause charges on surfaces which are perpendicular to said polar axis and which represent a measure of the angular velocity of rotation of said piezoceramic element.

2. A sensor as set forth in claim 1, wherein said piezoceramic component has a nodal line, said sensor further comprising two mountings attached to said sensor in a region of the nodal line.

3. A sensor as set forth in claim 2, wherein said piezoceramic component has longitudinal groove means in the region of the nodal line for receiving said mountings.

4. A sensor as set forth in claim 1, further comprising elastic electrically conductive spring means for supporting said sensor in a frame.

5. A sensor as set forth in claim 1, wherein said piezoceramic component comprises two elements having their polar axes extending parallel to each other, and excited in antiphase with oscillations, the measuring electrodes of the two elements being connected to one another such that their measuring signals are summarized while interference charges induced by vibration, compensate one another.

6. A sensor as set forth in claim 1, wherein said piezoceramic component comprises two elements each having a pair of plates arranged on a common substrate and equi-directional polar axes, shear motion of the two pairs being excited in antiphase and cophasally diagonally.

7. A sensor as set forth in claim 1, wherein a harmonic signal generated at said measuring electrodes and dependent on an amplitude of oscillation, is tapped before filtering in a signal path and is used to control the oscillation amplitude.

* * * * *